United States Patent [19]
Pawlik

[11] Patent Number: 5,672,035
[45] Date of Patent: Sep. 30, 1997

[54] TURN BROACHING MACHINE

[75] Inventor: James A. Pawlik, Sterling Heights, Mich.

[73] Assignee: Chrysler Corporation, Auburn Hills, Mich.

[21] Appl. No.: 715,812

[22] Filed: Sep. 16, 1996

[51] Int. Cl.$^6$ ........................................... B23C 5/28
[52] U.S. Cl. .................. 409/135; 82/900; 451/7; 451/488; 384/900
[58] Field of Search .................. 384/900, 467, 384/476; 82/900; 409/135, 244, 136; 451/488, 49, 7, 53

[56] References Cited

U.S. PATENT DOCUMENTS

| Re. 23,367 | 5/1951 | Garrison et al. | 82/900 |
|---|---|---|---|
| 2,352,206 | 6/1944 | Kendall | 82/900 |
| 2,452,046 | 10/1948 | Garrison et al. | 384/317 |
| 2,504,284 | 4/1950 | Voigt | 384/476 |
| 4,103,588 | 8/1978 | Schmid | 409/136 |
| 4,392,761 | 7/1983 | Eckle | 409/136 |
| 4,559,800 | 12/1985 | Brown | 72/342 |
| 4,668,135 | 5/1987 | Hunt | 409/136 |
| 4,719,830 | 1/1988 | Kawada et al. | 82/900 |
| 4,790,698 | 12/1988 | Heffron | 409/200 |
| 4,948,269 | 8/1990 | Hamilton | 384/467 |
| 5,592,882 | 1/1997 | Toyoda | 101/487 |

*Primary Examiner*—Daniel W. Howell
*Assistant Examiner*—Christopher Kirkman
*Attorney, Agent, or Firm*—Edward A. Craig

[57] ABSTRACT

A turn broaching machine for broaching a workpiece comprises a hollow arbor having a plurality of axially spaced apart, circumferentially extending cutting segments projecting radially outwardly from the side wall thereof. The cutting segments each have a radially outer peripheral edge provided with broaching elements. A closed loop system circulates a heated fluid through the arbor. The fluid is heated to an elevated temperature of about 100 F.–150 F. to maintain the arbor in a similarly heated condition during broaching. Maintaining the arbor at a relatively constant, elevated temperature during broaching stabilizes the broach by eliminating axial thermal expansion.

5 Claims, 4 Drawing Sheets

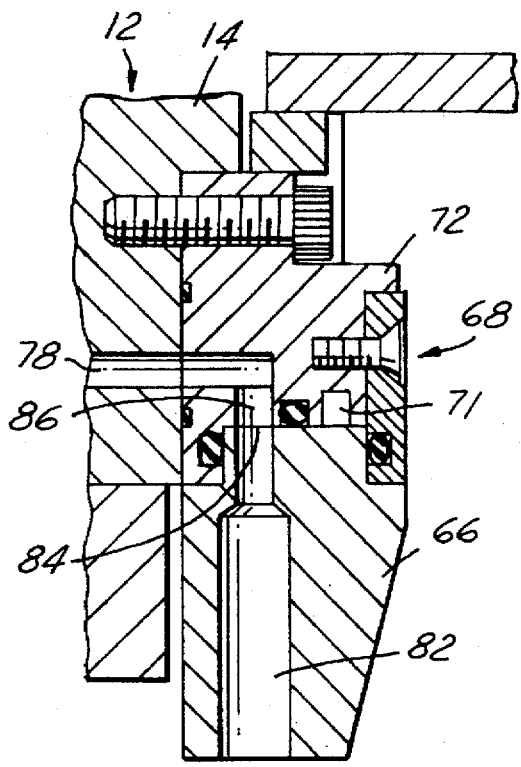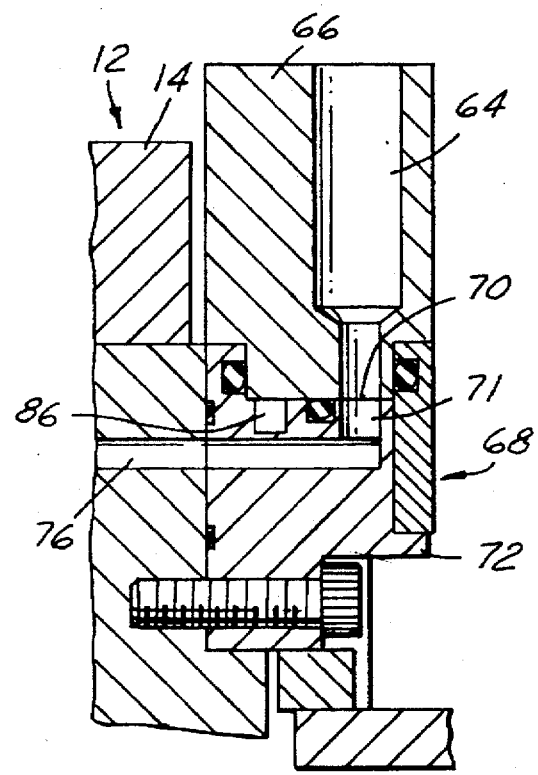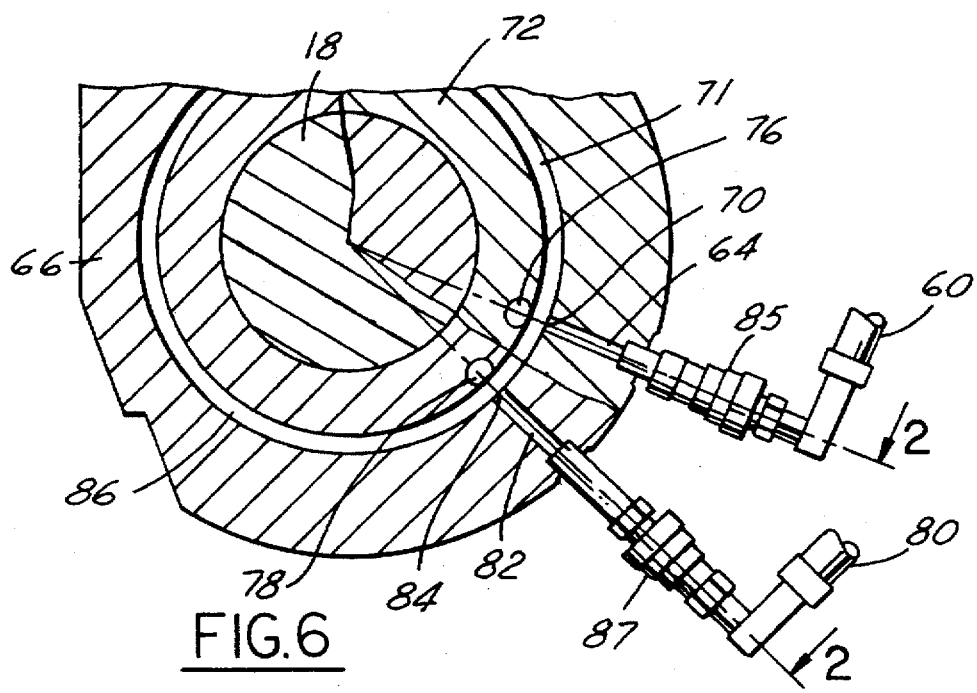

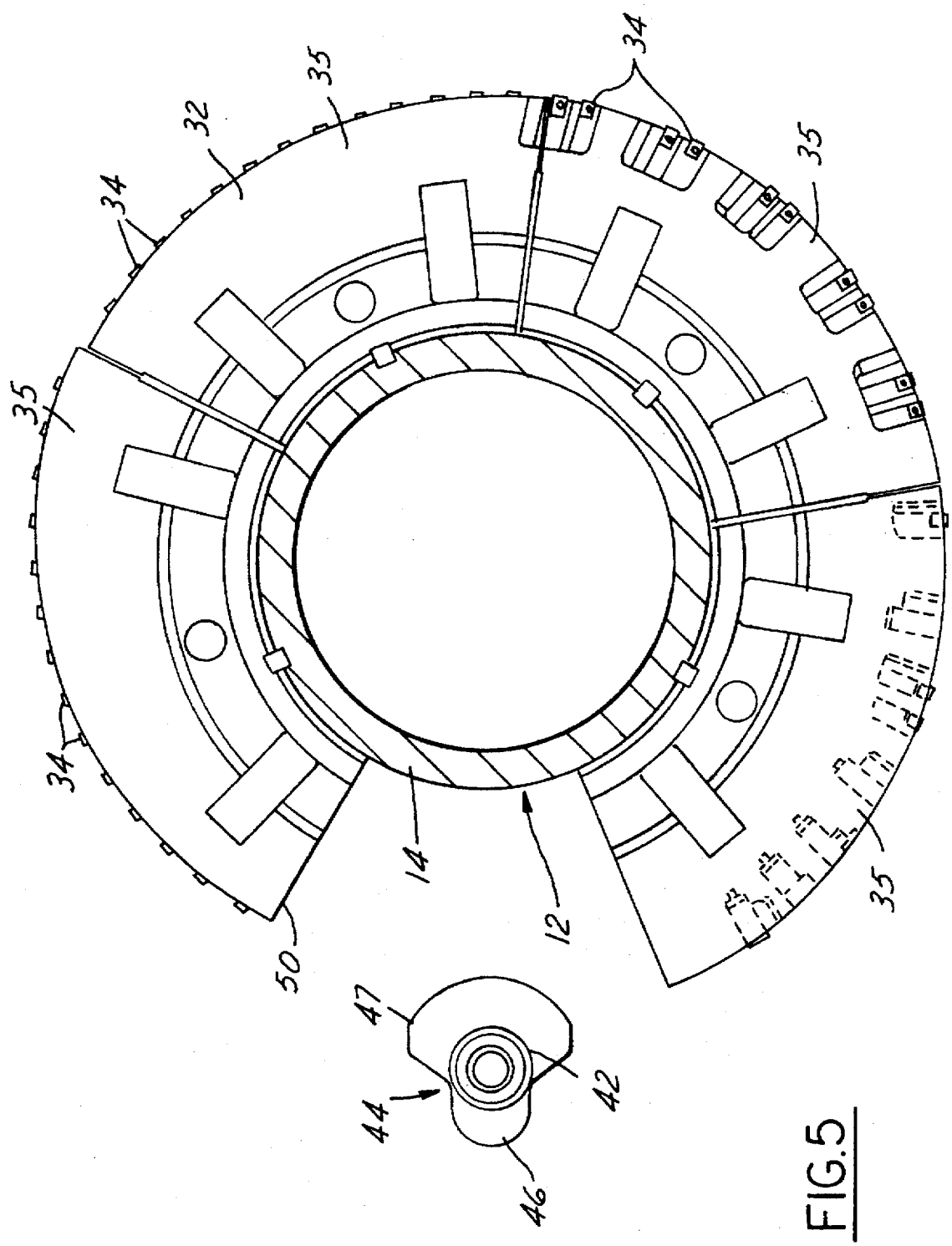

5,672,035

TURN BROACHING MACHINE

Field of Invention

This invention relates generally to turn broaching machines and more particularly to the thermal stabilization of a turn broaching arbor.

BACKGROUND AND SUMMARY OF THE INVENTION

The arbor used in turn broaching heats up during a production run, causing thermal expansion and often requiring the scrapping of the first several pieces before the arbor stabilizes thermally. Once the arbor stabilizes, there is no problem, but until it does, many parts may have to be scrapped. The arbor used to broach the bearings on a crankshaft has several axially spaced broaching segments which broach all of the bearings simultaneously. Thermal expansion of the arbor in the axial direction is particularly troublesome when broaching these crankshaft bearings.

In accordance with the present invention, the arbor is preheated to an elevated temperature and maintained at that temperature throughout the production run. This is accomplished by a heated fluid in the arbor. Preferably, the fluid is circulated through the arbor continuously. As a result, the arbor stays at a constant temperature and there is little or no thermal expansion, even at the beginning of a production run.

One object of this invention is to provide a heated, thermally stable turn broaching arbor having the foregoing features and capabilities and which may include a closed loop system for continuously circulating a heated fluid through the arbor.

Another object is to provide a heated, thermally stable turn broaching arbor which is composed of a relatively few simple parts, is rugged and durable in use, and is capable of being readily manufactured, assembled and installed.

These and other objects, features and advantages of the invention will become more apparent as the following description proceeds, especially when considered with the accompanying drawings.

BRIEF DESCRIPTION OF THE DRAWINGS

FIG. 3 is an enlarged sectional view of a portion of the fluid coupling forming part closed loop system.

FIG. 4 is an enlarged sectional view of another portion of the fluid coupling.

FIG. 5 is an end view, partly in section, of the arbor shown in relation to the crankshaft being broached.

FIG. 6 is a fragmentary sectional view of the arbor and part of the closed loop system

DETAILED DESCRIPTION OF THE PREFERRED EMBODIMENT

Figure 1:
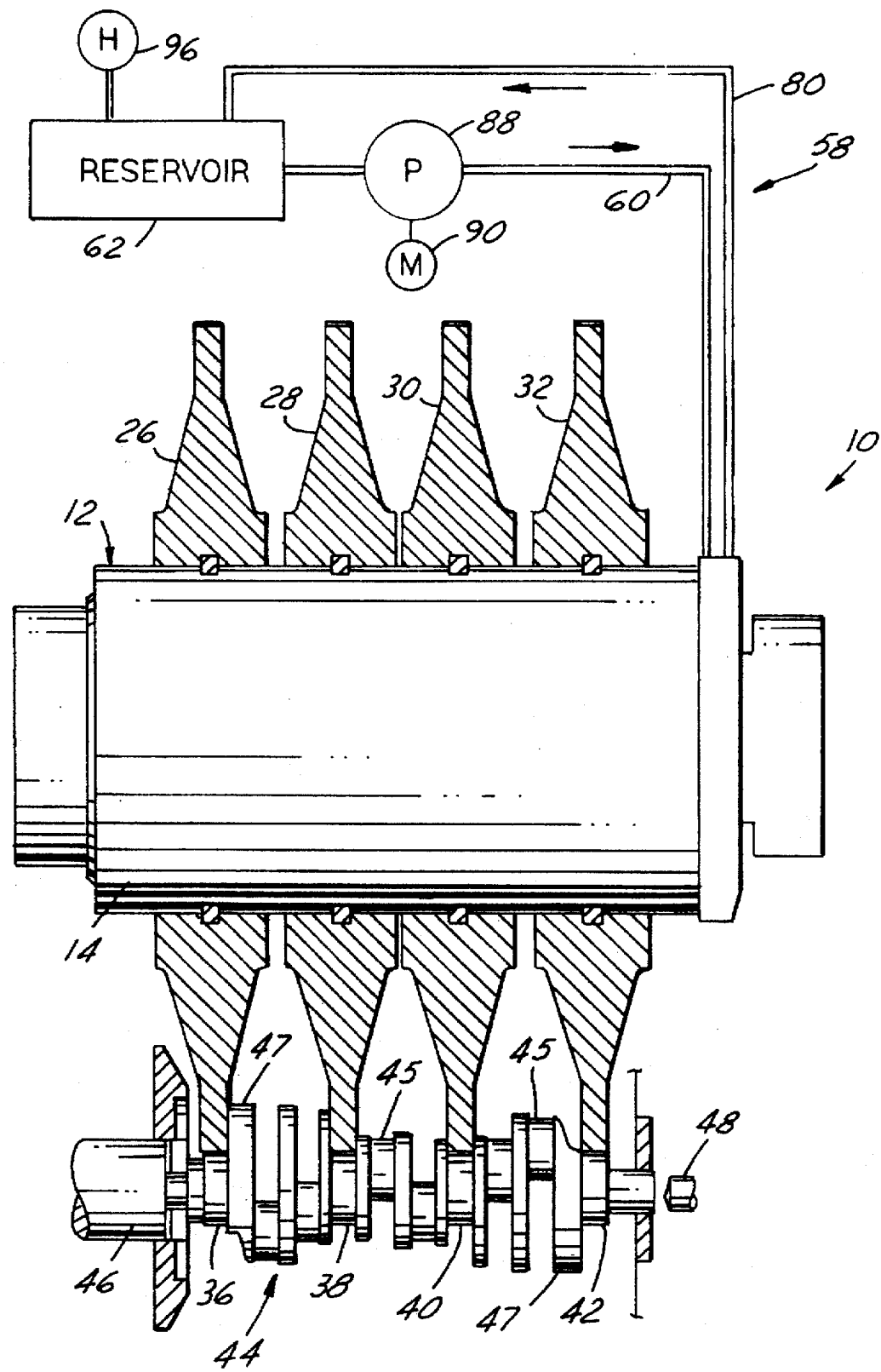
FIG. 1 is an elevational view with parts in section showing a turn broaching arbor in a position to broach the bearings of a crankshaft, and with a closed loop system for circulating a heated fluid through the arbor.
Figure 2:
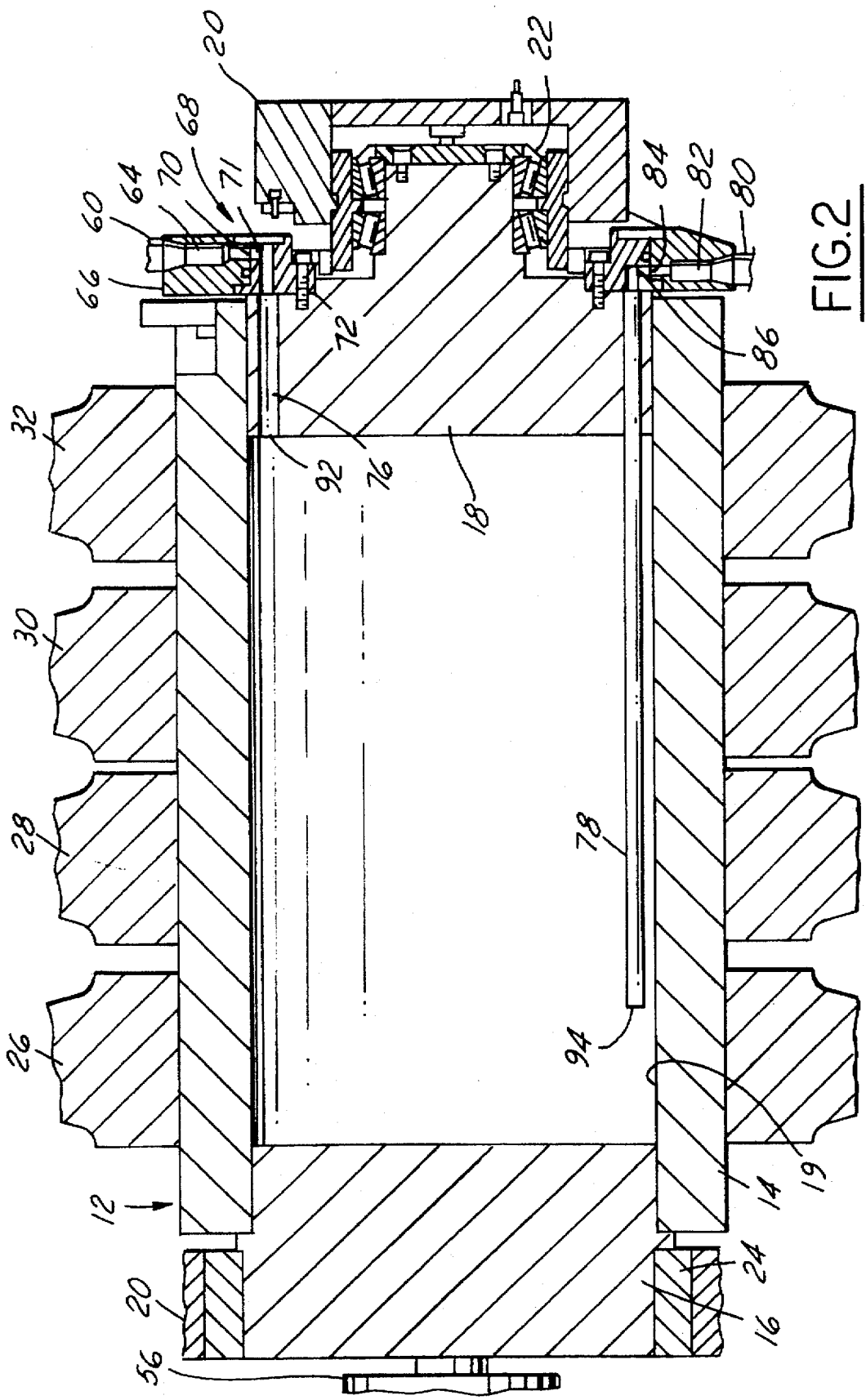
FIG. 2 is an enlarged sectional view of the arbor taken on the line 2—2 in FIG. 6.

Referring now more particularly to the drawings, the broaching machine 10 comprises an elongated hollow arbor 12 which has a cylindrical side wall 14 and end caps 16 and 18 defining a chamber 19. The arbor is supported for axial rotation in rigid support structure 20. More specifically, one end of the arbor is supported in a bearing 22 secured to the support structure, and the opposite end is supported in a similar bearing or in a bearing ring 24 also secured to the support structure. The side wall 14 of the arbor is concentric with its axis of rotation.

The arbor 12 has a plurality of axially spaced-apart radially outwardly projecting segments 26, 28, 30 and 32 secured to the side wall 14. Broaching elements 34 are mounted on the radially outer peripheral edge of the broaching segments. If desired, the segments may be divided into several arcuately extending parts 35 as shown in FIG. 5.

The arbor 12 is shown in FIGS. 1 and 5 in position to broach the bearings 36, 38, 40 and 42 of a crankshaft 44. The crankshaft has crank pins 45 and counterweights 47 and is mounted in a head stock 46 and a tailstock 48 for rotation by a drive motor, not shown. The axis of the crankshaft is parallel to the axis of the arbor and the bearings 36-42 of the crankshaft are respectively opposed to the broaching segments in positions to be broached by the broaching elements 34.

As shown in FIG. 5, all of the broaching segments are circumferentially interrupted or notched as indicated at 50. The notch defines the circumferential beginning and end of the periphery of each broaching segment.

A motor 56 is provided for turning the arbor about its axis at a relatively low speed preferably 1 to 6 revolutions per minute. A drive motor (not shown) is provided for rotating the crankshaft at a relatively high speed, on the order of 650-1,000 revolutions per minute. The arbor will normally be rotated only one complete revolution to complete the broaching of the several bearings of the rapidly rotating crankshaft.

A closed loop system 58 for a heated fluid, such as a very thin, flowable hydraulic oil, is provided to keep the chamber 19 in the arbor filled with the heated fluid at all times during broaching. The closed loop system comprises a supply line 60 which runs from the reservoir 62 through a drilled hole 64 in the stationary ring 66 of a fluid coupling 68 to an entry port 70 which opens into an annular groove 71 in a second ring 72 of the fluid coupling. The ring 66 of the fluid coupling is secured to suitable support structure. The ring 72 is secured to and rotates with the end of the arbor, and interfits with the stationary ring 66 as shown. An axially extending conduit 76 in the end cap 18 and the ring 72 extends from the groove 71 in the ring 72 into the interior of the arbor, so that the fluid in the reservoir may flow through the supply line 60, the coupling 68 and the conduit 76 into the arbor.

Fluid in the arbor may return to the reservoir 62 through the axially extending conduit 78, the fluid coupling 68, and the return line 80. More specifically, the return line 80 extends from the reservoir through a drilled hole 82 in the stationary ring 66 to an outlet port 84 which opens into an annular groove 86 in the ring 72. The axially extending conduit 78 extends from the groove in ring 72 through end cap 18 to the interior of the arbor. Quick disconnect couplings 85 and 87 in lines 60 and 80 enable the arbor to be removed and replaced rapidly.

A pump 88 in the supply line 60 is driven continuously by a motor 90 to force the heated fluid from the reservoir 62 into chamber 19 of the arbor. The arbor is kept full of fluid at all times during broaching.

The conduit 76 has an open end 92 adjacent one end of the arbor 12 and the conduit 78 has an open end 94 adjacent the opposite end of the arbor. Hence, there a continuous circulation of fluid through the chamber 19 in the arbor as the pump continues to operate, with flow entering the arbor near one end thereof and being withdrawn from the arbor near the other end.

A thermostatically controlled heating unit 96 is provided to maintain a constant temperature of the fluid in the reservoir. Preferably, the constant fluid temperature in the reservoir is in a range on the order of about 100° F.–150° F., and ideally at about 110° F. The fluid loses little, if any, heat on its travel from the reservoir to the arbor and the circulation of fluid is fast enough to ensure that the temperature of the fluid within the arbor is substantially the same as the temperature of the fluid in the reservoir. In a very short period of time, the arbor and the broaching segments are heated up to substantially the same temperature as the circulating fluid.

In use, the arbor will be rotated relatively slowly and the crankshaft will be rotated relatively rapidly. In one mm of the arbor, the broaching of the beatings of the crankshaft is completed. Before commencing the broaching operation, and if the arbor is not pre-heated in the tool room, a period of up to 30 minutes may be allowed to elapse to ensure that the temperature of the arbor and the broaching segments is raised up to the temperature of the heated fluid circulating therethrough. As a result, the arbor temperature will remain substantially constant throughout the broaching of the bearings of a large number of crankshafts. The heat generated by the broaching operation is relatively insignificant compared to the temperature of the arbor and any tendency for the arbor to increase in temperature due to the broaching will produce only a corresponding marginal increase in the temperature of the heated fluid which will promptly be stabilized by the action of the thermostatically controlled heating unit. Thus, the arbor, being maintained at a constant temperature throughout a run of parts, will have no tendency to expand thermally in the axial direction or in any other direction, so that the arbor will be stabilized and will produce a consistent run of acceptable parts. The problem heretofore experienced of having to scrap the first several parts in a production run because of thermal expansion of the arbor is eliminated by keeping its temperature constant as a result of the constant elevated temperature of the heated fluid being circulated through the arbor.

In order to avoid the small delay in starting the broaching operation after the heated fluid begins to circulate through the arbor so that the arbor will be brought up to full temperature at the start of a production run, the arbor before being installed in the machine for a production run can be hooked up to a similar closed circuit fluid circulating system in the tool room. In that way, the arbor will already be heated up to full operational temperature before it is installed in the machine.

What is claimed is:

1. A turn broaching machine for broaching a workpiece comprising a hollow broaching arbor having a central rotational axis and a cylindrical side wall concentric with said rotational axis, a plurality of axially spaced apart, circumferentially extending cutting segments projecting radially outwardly from said side wall, said cutting segments each having a radially outer peripheral edge provided with broaching elements, a closed loop system for circulating a heated fluid through the arbor, said system comprising a fluid coupling at one end of said arbor including a stationary ring, said coupling also including a second ring secured in concentric relation to said arbor and interfitting with said stationary ring, a reservoir for the heated fluid, means for heating the fluid in said reservoir to a substantially constant temperature in a range on the order of about 100° F.–150° F. and maintaining the fluid at that temperature, a first fluid line from said reservoir to an entry end thereof in said stationary ring, a second fluid line from an exit end thereof in said stationary ring to said reservoir, said second ring having a first conduit communicating with the interior of said arbor and with the entry end of said first fluid line enabling fluid from said first fluid line to enter said arbor and having a second conduit communicating with the interior of said arbor and with the exit end of the second fluid line enabling fluid in said arbor to be withdrawn from said arbor through said second fluid line, and a pump for maintaining a flow of fluid to and from said arbor in said first and second fluid lines.

2. A turn broaching machine as defined in claim 1, wherein one of said conduits opens into the interior of said arbor adjacent one end thereof, and the other of said conduits opens into the interior of said arbor adjacent the other end thereof.

3. A turn broaching machine as defined in claim 2, and further including a motor for operating said pump continuously to provide a continuous circulation of heated fluid through said arbor at said temperature to maintain the arbor in a similarly heated condition during broaching.

4. A turn broaching machine as in claim 3, wherein said fluid is heated to a temperature of about 110° F.

5. A turn broaching machine as in claim 4, and further including quick-disconnect couplings in said respective first and second fluid lines.

* * * * *